Jan. 6, 1948.  M. B. GAUSE ET AL  2,433,946
PHOTOELECTRICALLY CONTROLLED APPARATUS FOR
GRADING PEARS ACCORDING TO LENGTH
Filed Oct. 27, 1942  3 Sheets-Sheet 2

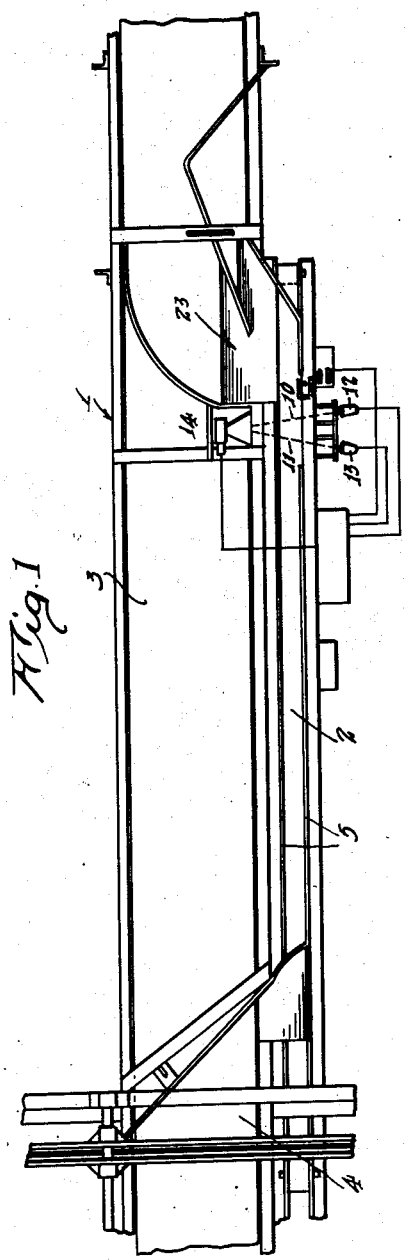
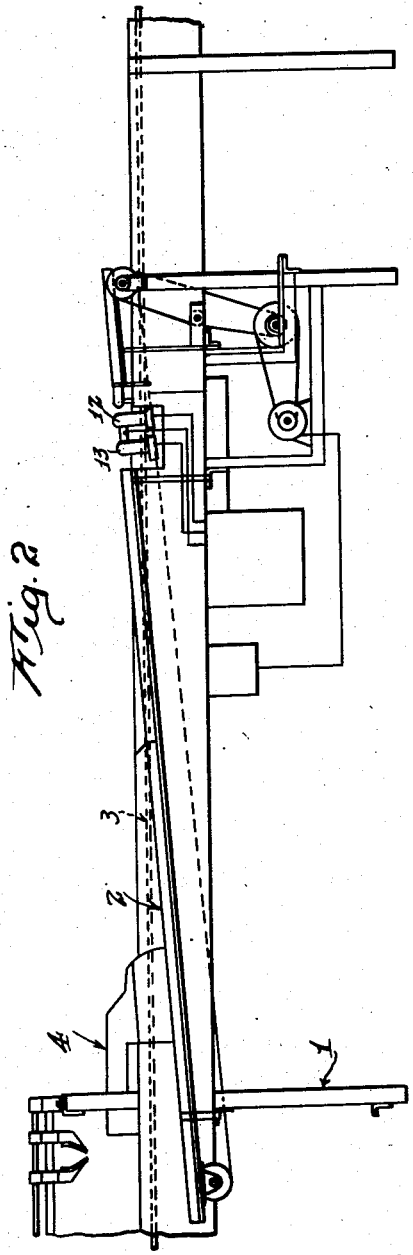

Inventors
Marvin B. Gause
Eathel O. Burling

By Lyon & Lyon
Attorneys

Jan. 6, 1948. M. B. GAUSE ET AL 2,433,946
PHOTOELECTRICALLY CONTROLLED APPARATUS FOR
GRADING PEARS ACCORDING TO LENGTH
Filed Oct. 27, 1942 3 Sheets-Sheet 3

Inventors
Marvin B. Gause
Eathel O. Burling

By Lyon & Lyon
Attorneys

Patented Jan. 6, 1948

2,433,946

UNITED STATES PATENT OFFICE 2,433,946

PHOTOELECTRICALLY CONTROLLED APPARATUS FOR GRADING PEARS ACCORDING TO LENGTH

Marvin B. Gause, Yakima, and Eathel O. Burling, Vancouver, Wash., assignors to California Packing Corporation, San Francisco, Calif., a corporation of New York Application October 27, 1942, Serial No. 463,524

1 Claim. (Cl. 209—82)

This invention relates to apparatus for grading fruit, and is more particularly related to apparatus for grading fruit, such as pears, in accordance with their length.

It is an object of this invention to provide apparatus for grading fruit, vegetables, such as pears and the like, in accordance with their length.

Another object of this invention is to provide a grader in which fruit or vegetables is caused to travel in a predetermined position in single file through a selecting medium wherein the length of said object acts to disrupt light beams when such objects exceed a predetermined length, whereby such objects may be diverted from the path.

Another object of this invention is to provide a grader adapted to grade fruit or vegetables of a perishable nature in accordance with their length and wherein means are provided for segregating fruit or grading the same which is of large capacity, and also provides for the hand'ing of such fruit or vegetables in order to avoid damage thereto.

Other objects and advantages of this invention it is believed will be apparent from the following detailed description of a preferred embodiment thereof as illustrated in the accompanying drawings.

In the drawings:

Figure 1 is a plan view of a grader embodying our invention.

Figure 2 is a side elevation thereof.

Figure 3:
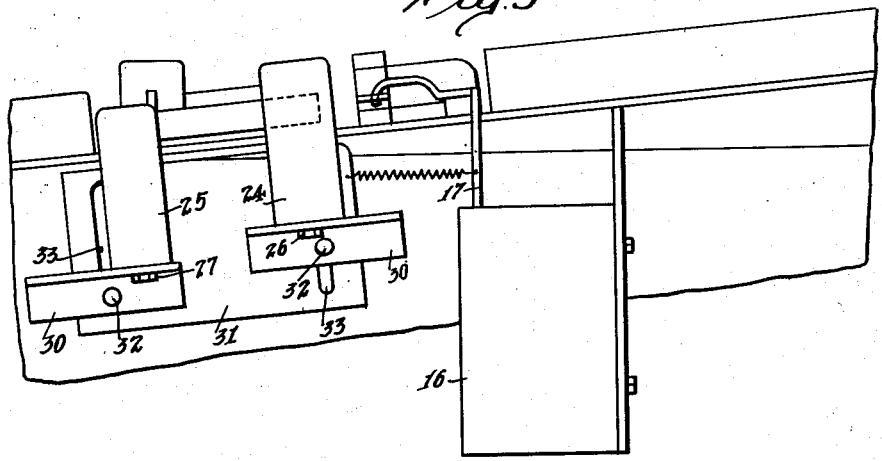
Figure 3 is an enlarged fragmental elevation of the selector control means embodied in our invention.

Our invention as herein set forth is particularly applicable for the grading of fruits or vegetables where sections of such fruits or vegetables are of different diameter and for grading such fruits or vegetables in accordance with their length. As illustrative of such grading, we have chosen to describe our invention as the same is particularly adapted for the grading of pears in accordance with the length of the individual pear.

In the apparatus embodying our invention as illustrated in the drawings, we have found that in the grading of articles such as fruit or vegetables with reference to their length that it is particularly advisable to provide a means operable in accordance with the length of such articles and which means employs as a reference the longitudinal axis of such articles. In the case of pears and similar articles, it is particularly important as the said fruit is of different diameter at its different ends and as ordinarily supported, the axis of such a fruit will therefore be inclined with reference to the support. We have also found that in the grading of such fruit it is essential to insure that the fruit is all positioned prior to the grading thereof with one end foremost, for example, in pears the calyx end, so that the selecting means operating with reference to the longitudinal axis of such a pear may be set to approximate the inclination of the axis of such article upon its support.

As our invention is illustrated in the accompanying drawings, the apparatus includes the frame 1 upon which there is supported a pair of continuous endless conveyors 2 and 3. The pears to be graded are fed onto the grading conveyer 2 from a feed 4 which may be the discharge of a succeeding grader, for example, a grader commonly used in this art for grading pears in accordance with the diameter of their largest section. The grader conveyer 2 is formed with a pair of guide flanges 5 forming a channel for the conveyer 2. Within the channel thus formed there are mounted convex guide rails 6 having a convex half round shoulder 7 which lies immediately over the surface provided by the conveyer 2. As illustrated, the conveyer 2 has a concave surface 8. The conveyer 2 is supported upon a base board 9 which is secured to the frame 1. The conveyer 2 is caused to travel at such speed as will insure that all of the pears received thereon turn in conjunction with the convex shoulders 7 to a position where their calyx end are foremost on the conveyer. This speed we have found to be somewhere in the neighborhood of 372 feet per minute more or less, depending upon the size and type of pears being graded.

The pears upon the conveyor 2 travel into the path thus defined through two spaced light beams 10 and 11, produced from two separate light sources 12 and 13.

The two light sources 12 and 13 direct the light beams 10 and 11 into a photoelectric tube 14 which is operative on a quantitative light basis, that is, the photoelectric tube is sensitive to the quantity of light thereby completing an electric circuit as will hereinafter be described when the quantity of light which it is adjusted to receive is dimensioned beyond a predetermined point. In this case the photoelectric tube 14 is set so that it will operate only when the quantity of light directed into it is such as will be found when both the light beams 10 and 11 are simultaneously interrupted. Thus by proper spacing of the light beams 10 and 11 by adjustment of the light sources 12 and 13, the length of the pear required to intercept both light beams may be determined.

Figure 5:
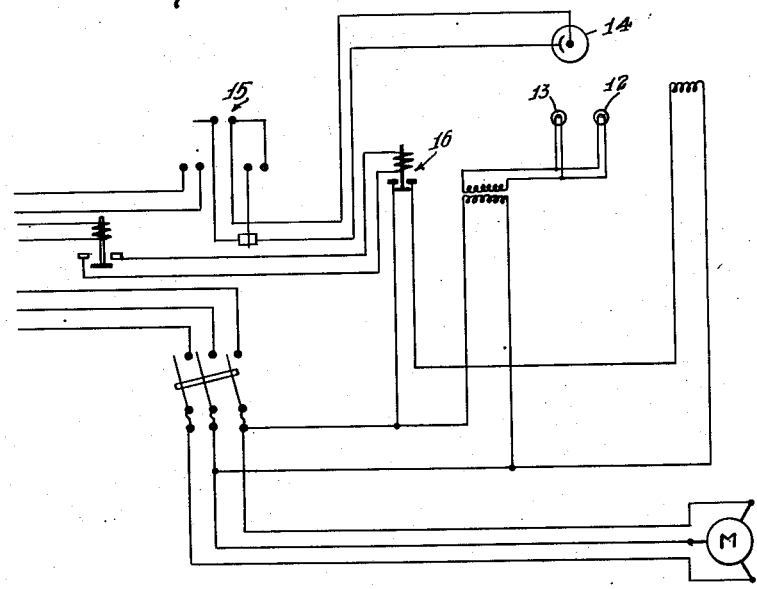
Figure 5 is a wiring diagram.
Figure 6:
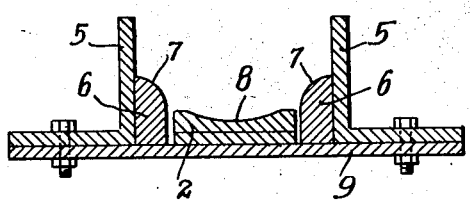
Figure 6 is an enlarged sectional end view of the conveyor and guide means embodied in our invention.

The photoelectric tube 14 is so adjusted in the circuit with the lamps 12 and 13 that interruption of only one of the light beams will not cause the photoelectric tube 14 to operate to actuate the relay circuit in which it is mounted. The circuit in which the photoelectric tube 14 and light sources 12 and 13 are mounted is indicated in Figure 5 wherein it is illustrated that the supply of light to the photoelectric tube 14 if sufficiently interrupted a relay 15 will close, closing the circuit leading to the electromagnet 16.

Figure 4:
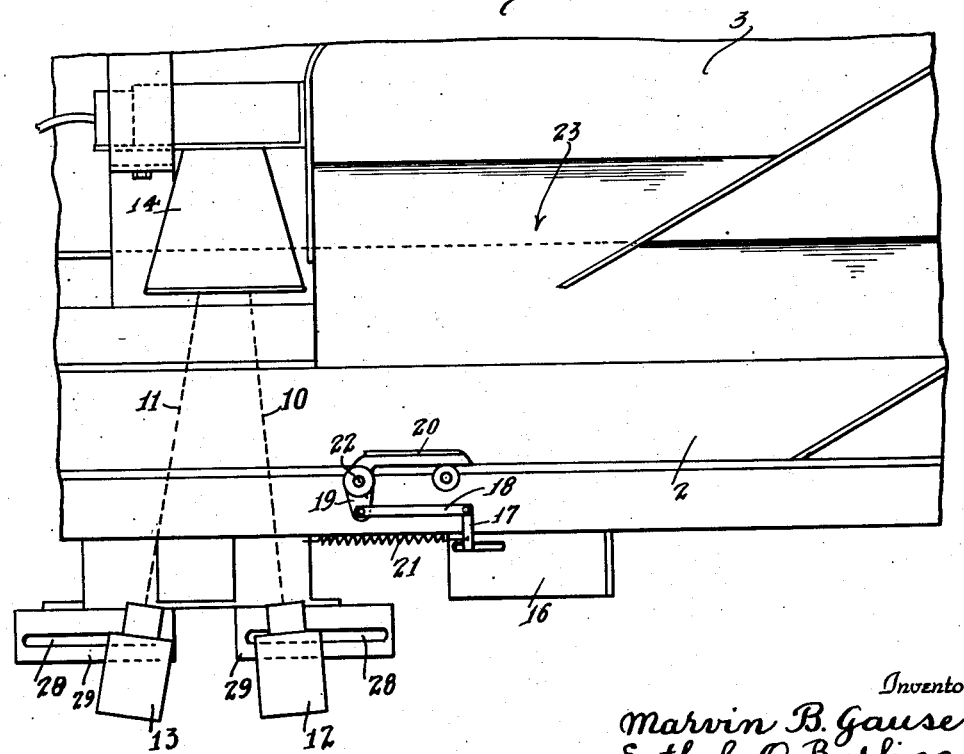
Figure 4 is a top plan view of the structure as illustrated in Figure 3.

As illustrated in Figures 3 and 4, the electromagnet 16 has its armature 17 connected by a link 18 with the crank arm 19 of the shear gate 20. The gate 20 is normally held in closed position by means of a spring 21 holding the armature 17 in position to operate through the link 18 to swing the shear gate 20 on its pivot 22 to its open position over the conveyer 2. When the light source to the photoelectric tube 14 is interrupted by interruption of both of the light beams 12 and 13, the aforesaid relays are closed, energizing the electromagnet 16 and causing the shear gate 20 to swing across the conveyer 2, causing the long pear to be discharged over the discharge bore 23 onto the grader conveyer 3.

In order to permit the operation of our grader of pears of different sizes or lengths and to thereby provide for adjustment of the spacing and positioning of the beams 10 and 11, the light sources 12 and 13 which may be of any suitable or desirable form are adjustably mounted so that they may be moved either to intensify the light directed into the photoelectric tube 14 or to vary or change their vertical relationship over the conveyer 2. Thus each of the light sources 12 and 13 is mounted in housings 24 and 25. The housings are supported on pins 26 and 27 mounted in slots 28 formed in the supporting plates 29 which permits adjustment to move the housings to or away from each other.

The plates 29 are in turn secured to brackets 30 and the brackets 30 are supported on a base plate 31 by means of pins 32 which pass in slots 33 formed in the base plate 31. This permits of relative vertical adjustment of the light beams 10 and 11 over the conveyer 2 so that the light beams may be adjusted to the angularity of the longitudinal axis of the pears to be graded in accordance with the inclination of such pears as is caused by their lying upon the conveyer 2 with their calyx end foremost.

We have found that it is particularly advisable in grading such fruit as pears to adjust the light beams 10 and 11 as closely as possible to the longitudinal axis of such fruit in order to insure accurate grading as to length of the fruit.

Having fully described our invention, it is to be understood that we do not wish to be limited to the details herein set forth, but our invention is of the full scope of the appended claim.

We claim:

In an apparatus for grading pears as to length which includes, a conveyer of the continuously moving type, the conveyer having a transversely concave pear supporting surface, side flanges for the conveyer having convex shoulders extending above the conveyer surface whereby the pears moved with said conveyer will be positioned with their large ends foremost, a pair of light sources spaced apart and positioned to direct spaced light beams over the conveyer at an angle approximating the angle of the longitudinal axis of the pears positioned on the conveyer, a discharge gate, a photoelectric cell having a light tube into which the light beams are directed, means operatively connecting the photoelectric cell and the gate whereby a pear of an axial length sufficient to intercept both light beams causes said cell to actuate the gate to a position over the conveyer to discharge the said long pear therefrom.

MARVIN B. GAUSE.
EATHEL O. BURLING.

REFERENCES CITED

The following references are of record in the file of this patent:

UNITED STATES PATENTS

| Number | Name | Date |
|---|---|---|
| 2,033,645 | Parkhill | Mar. 10, 1936 |
| 1,857,815 | Lafferty | May 10, 1932 |
| 1,259,905 | Phelps | Mar. 19, 1918 |
| 1,921,863 | Bickley | Aug. 8, 1933 |
| 1,649,304 | Gray | Nov. 15, 1927 |
| 2,280,948 | Gulliksen | Apr. 28, 1942 |

FOREIGN PATENTS

| Number | Country | Date |
|---|---|---|
| 790,265 | France | Sept. 2, 1935 |